(12) United States Patent
Chen

(10) Patent No.: US 11,994,837 B2
(45) Date of Patent: May 28, 2024

(54) ACCEPTABILITY CHECK METHOD AND CHECK SYSTEM FOR NEWLY-ADDED PRODUCTION TOOLS

(71) Applicant: CHANGXIN MEMORY TECHNOLOGIES, INC., Hefei (CN)

(72) Inventor: Yui-Lang Chen, Hefei (CN)

(73) Assignee: Changxin Memory Technologies, Inc., Hefei (CN)

( * ) Notice: Subject to any disclaimer, the term of this patent is extended or adjusted under 35 U.S.C. 154(b) by 379 days.

(21) Appl. No.: 17/453,974

(22) Filed: Nov. 8, 2021

(65) Prior Publication Data

US 2022/0075345 A1 Mar. 10, 2022

Related U.S. Application Data

(63) Continuation of application No. PCT/CN2021/099756, filed on Jun. 11, 2021.

(30) Foreign Application Priority Data

Sep. 10, 2020 (CN) .......................... 202010945285.1

(51) Int. Cl.
*G05B 19/4065* (2006.01)
*G05B 19/4099* (2006.01)

(52) U.S. Cl.
CPC ..... *G05B 19/4065* (2013.01); *G05B 19/4099* (2013.01); *G05B 2219/45031* (2013.01)

(58) Field of Classification Search
CPC ............ G05B 19/4065; G05B 19/4099; G05B 2219/45031; G05B 19/4184; Y02P 90/02
See application file for complete search history.

(56) References Cited

U.S. PATENT DOCUMENTS

2003/0065411 A1* 4/2003 Mugibayashi .......... H01L 22/20
257/E21.525
2004/0039472 A1* 2/2004 Shu .................... G05B 19/4188
700/121

(Continued)

FOREIGN PATENT DOCUMENTS

CN 101718850 A 6/2010
CN 103187329 A 7/2013

(Continued)

OTHER PUBLICATIONS

International Search Report as PCT Application No. PCT/CN2021/110889 mailed Nov. 9, 2021, 10 pages.

(Continued)

*Primary Examiner* — Christopher E. Everett
(74) *Attorney, Agent, or Firm* — Cooper Legal Group, LLC

(57) ABSTRACT

The embodiments of the present application provide an acceptability check method and check system for newly-added production tools. The check method includes: performing, after obtaining several new tool yield data and several old tool yield data, data analysis on the several new tool yield data and the several old tool yield data, determining whether the several new tool yield data and the several old tool yield data belong to a high yield category or a slightly higher yield category, eliminating the corresponding new tool yield data and old tool yield data if "yes", and taking the remaining new tool yield data and the remaining old tool yield data respectively as screened new tool yield data and screened old tool yield data; determining, based on the screened new tool yield data and the screened old tool yield data, whether the new production tool is acceptable.

14 Claims, 6 Drawing Sheets

(56) References Cited

U.S. PATENT DOCUMENTS

| | | | | |
|---|---|---|---|---|
| 2005/0260924 A1* | 11/2005 | Wu | ................... | B24B 37/042 |
| | | | | 451/8 |
| 2009/0035883 A1* | 2/2009 | Wang | ................... | H01L 22/12 |
| | | | | 257/E21.531 |
| 2015/0371134 A1* | 12/2015 | Chien | ............... | G05B 23/0294 |
| | | | | 706/21 |
| 2019/0129390 A1* | 5/2019 | Good | ................. | G05B 19/4187 |
| 2021/0370453 A1* | 12/2021 | Murakami | ......... | B23Q 3/15503 |

FOREIGN PATENT DOCUMENTS

| | | | |
|---|---|---|---|
| CN | 104677222 A | 6/2015 | |
| CN | 105225979 A | 1/2016 | |
| CN | 106093831 A | 11/2016 | |
| CN | 106503877 A | 3/2017 | |
| CN | 107037345 A | 8/2017 | |
| CN | 109411390 A | 3/2019 | |
| CN | 110431431 A | 11/2019 | |
| CN | 110907883 A | 3/2020 | |
| JP | H03175317 A | 7/1991 | |
| WO | 2014081897 A1 | 5/2014 | |

OTHER PUBLICATIONS

International Search Report as PCT Application No. PCT/CN2021/099756 mailed Sep. 16, 2021, 4 pages.

* cited by examiner $$f_1(x_j) = \begin{cases} 1, & \text{if } x_j \le c_1; \\ (c_2 - x_j)(c_2 - c_1)^{-1}, & \text{if } c_1 < x_j \le c_2; \\ 0, & \text{otherwise.} \end{cases}$$

$$f_2(x_j) = \begin{cases} (x_j - c_1)(c_2 - c_1)^{-1}, & \text{if } c_1 < x_j \le c_2; \\ (c_3 - x_j)(c_3 - c_2)^{-1}, & \text{if } c_2 < x_j \le c_3; \\ 0 & \text{otherwise.} \end{cases}$$

$$f_3(x_j) = \begin{cases} 1, & \text{if } x_j > c_3; \\ (x_j - c_2)(c_3 - c_2)^{-1}, & \text{if } c_2 < x_j \le c_3; \\ 0, & \text{otherwise.} \end{cases}$$

Model β (in case of two center points)

$$f_4(x_j) = \begin{cases} 1, & \text{if } x_j \leq c_1, \\ (c_2 - x_j)(c_2 - c_1)^{-1}, & \text{if } c_1 < x_j \leq c_2; \\ 0, & \text{otherwise.} \end{cases}$$

$$f_5(x_j) = \begin{cases} 1, & \text{if } x_j > c_2; \\ (x_j - c_1)(c_2 - c_1)^{-1}, & \text{if } c_1 < x_j \leq c_2; \\ 0, & \text{otherwise.} \end{cases}$$

Model γ (in case of one center point or no center point)

ACCEPTABILITY CHECK METHOD AND CHECK SYSTEM FOR NEWLY-ADDED PRODUCTION TOOLS

CROSS-REFERENCE TO RELATED APPLICATIONS

This application is a continuation application of International Patent Application No. PCT/CN2021/099756, filed on Jun. 11, 2021, which claims priority to Chinese Patent Application No. 202010945285.1, filed on Sep. 10, 2020 and titled "ACCEPTABILITY CHECK METHOD AND CHECK SYSTEM FOR NEWLY-ADDED PRODUCTION TOOLS". International Patent Application No. PCT/CN2021/099756 and Chinese Patent Application No. 202010945285.1 are incorporated into the present application by reference in their entireties.

TECHNICAL FIELD

The present application relates to the field of semiconductors, and in particular to an acceptability check method and check system for newly-added production tools.

BACKGROUND

Integrated circuits are a class of micro electronic devices or components. According to such integrated circuits, by utilizing semiconductor manufacturing processes such as oxidation, photoetching, diffusion, epitaxy, masking, sputtering or the like, elements such as transistors, resistors, capacitors, inductors or the like as well as wirings, which are required in a circuit, are interconnected and then fabricated on one or several small semiconductor wafers or dielectric substrates, followed by being encapsulated within a package to attain a microstructure or chip having desired circuit functions.

At the time of fabrication of the integrated circuit, every step in the semiconductor manufacturing process is executed on a corresponding semiconductor production tool (or a production device). For instance, a corresponding furnace tube device is utilized for the oxidation process and a corresponding photoetching device is utilized for photolithography.

To increase production capacity, a new production tool is usually added to a Fab. The performance of this newly-added production tool needs to be verified before it is put into production, with the aim of determining whether the newly-added production tool can be used for production or whether it is acceptable. Currently, whether the newly-added production tool is acceptable or not is determined by measuring the yield data of wafers that undergo the processes in the newly-added production tool. This determination procedure has no unified standard or flow and is also highly affected by subjective factors such as processes or personnel, and the accuracy of the check results needs to be improved.

SUMMARY

The embodiments of the present application provide an acceptability check method and check system for newly-added production tools, enabling standardization of the check procedure and improvement of the accuracy of the check results.

The embodiments of the present application provide an acceptability check method for newly-added production tools, which includes:

providing a new production tool newly installed on a Fab, and an old production tool already available on the Fab;
providing several wafers to be detected, the several wafers to be detected being divided into a first portion of wafers and a second portion of wafers;
performing corresponding processes on the first portion of wafers in the new production tool;
performing corresponding processes on the second portion of wafers in the old production tool;
performing yield measurement on the first portion of wafers subjected to the processes in the new production tool, to obtain several new tool yield data;
performing yield measurement on the second portion of wafers subjected to the processes in the old production tool, to obtain several old tool yield data;
performing data analysis on the several new tool yield data and the several old tool yield data, determining whether the several new tool yield data and the several old tool yield data belong to a high yield category or a slightly higher yield category, eliminating the corresponding new tool yield data and old tool yield data if "the several new tool yield data and the several old tool yield data belong to the high yield category or the slightly higher yield category", and taking the remaining new tool yield data and the remaining old tool yield data respectively as screened new tool yield data and screened old tool yield data; and
determining, based on the screened new tool yield data and the screened old tool yield data, whether the new production tool is acceptable.

The embodiments of the present application further provide an acceptability check system for newly-added production tools, which includes:

a wafer providing unit, configured to provide several wafers to be detected, the several wafers to be detected being divided into a first portion of wafers and a second portion of wafers;
a new production tool, configured to perform corresponding processes on the first portion of wafers;
an old production tool, configured to perform corresponding processes on the second portion of wafers;
a yield data measuring unit, configured to perform yield measurement on the first portion of wafers subjected to the processes in the new production tool, to obtain several new tool yield data, and perform yield measurement on the second portion of wafers subjected to the processes in the old production tool, to obtain several old tool yield data;
a data analyzing unit, configured to perform data analysis on the several new tool yield data and the several old tool yield data, determine whether the several new tool yield data and the several old tool yield data belong to a high yield category or a slightly higher yield category, eliminate the corresponding new tool yield data and old tool yield data if "the several new tool yield data and the several old tool yield data belong to the high yield category or the slightly higher yield category", and take the remaining new tool yield data and the remaining old tool yield data respectively as screened new tool yield data and screened old tool yield data; and
a determining unit, configured to determine, based on the screened new tool yield data and the screened old tool yield data, whether the new production tool is acceptable.

DESCRIPTION OF EMBODIMENTS

As described in the Background, the existing procedure of determining whether the newly-added production tools are acceptable has no unified standard or flow and is also highly affected by subjective factors such as processes or personnel, and the accuracy of check results needs to be improved.

To this end, the embodiments of the present application provide an acceptability check method and check system for newly-added production tools. The check method includes: performing, after obtaining several new tool yield data and several old tool yield data, data analysis on the several new tool yield data and the several old tool yield data, determining whether the several new tool yield data and the several old tool yield data belong to a high yield category or a slightly higher yield category, eliminating the corresponding new tool yield data and old tool yield data if "the several new tool yield data and the several old tool yield data belong to the high yield category or the slightly higher yield category", and taking the remaining new tool yield data and the remaining old tool yield data respectively as screened new tool yield data and screened old tool yield data; and determining, based on the screened new tool yield data and the screened old tool yield data, whether the new production tool is acceptable. Through the foregoing check method, the acceptability check procedure for newly-added production tools is standardized and streamlined, and several new tool yield data and several old tool yield data are taken as original data during this check procedure. In addition, by using the new tool yield data and the old tool yield data in the high yield category or the slightly higher yield category that has a great impact upon the accuracy and effectiveness of the new tool acceptability check results, both the accuracy of the new tool acceptability check results and the efficiency of the new tool acceptability check procedure can be improved.

In order to make the above objects, features and advantages of the present application more apparent and understandable, the specific implementations of the present application will be described below in detail with reference to the accompanying drawings. When describing the embodiments of the present application in detail, the schematic diagrams attached hereto, for illustrative purposes, are not partially enlarged based on the regular scale, and are not intended to limit the protection scope of the present application but only serve as examples. Besides, the three-dimensional size of length, width and depth should be made clear in practical application.

Figure 1:
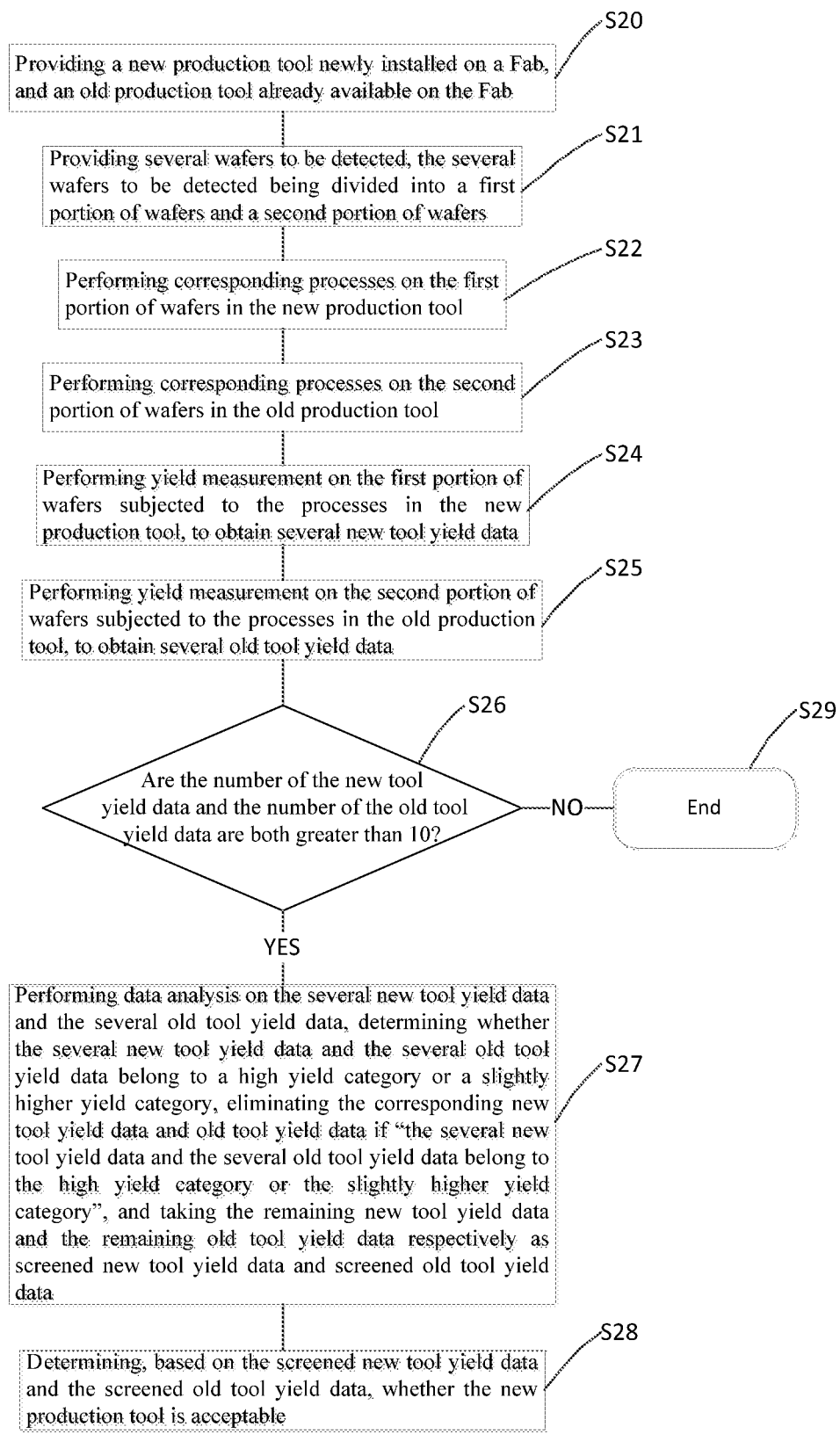
FIG. 1 to FIG. 4 are schematic flow charts of the acceptability check method for newly-added production tools according to the embodiments of the present application.

Referring to FIG. 1, an embodiment of the present application provides an acceptability check method for newly-added production tools, which includes:

S20: providing a new production tool newly installed on a Fab, and an old production tool already available on the Fab;

S21: providing several wafers to be detected, the several wafers to be detected being divided into a first portion of wafers and a second portion of wafers;

S22: performing corresponding processes on the first portion of wafers in the new production tool;

S23: performing corresponding processes on the second portion of wafers in the old production tool;

S24: performing yield measurement on the first portion of wafers subjected to the processes in the new production tool, to obtain several new tool yield data;

S25: performing yield measurement on the second portion of wafers subjected to the processes in the old production tool, to obtain several old tool yield data;

S26: determining whether the number of the new tool yield data and the number of the old tool yield data are both greater than 10, if "yes", executing S27, and if "no", executing S29 to end the check flow;

S27: performing data analysis on the several new tool yield data and the several old tool yield data, determining whether the several new tool yield data and the several old tool yield data belong to a high yield category or a slightly higher yield category, eliminating the corresponding new tool yield data and old tool yield data if "the several new tool yield data and the several old tool yield data belong to the high yield category or the slightly higher yield category", and taking the remaining new tool yield data and the remaining old tool yield data respectively as screened new tool yield data and screened old tool yield data; and S28: determining, based on the screened new tool yield data and the screened old tool yield data, whether the new production tool is acceptable.

The foregoing procedure will be described in details below with reference to the accompanying drawings.

S20 is executed: providing a new production tool newly installed on a Fab, and an old production tool already available on the Fab.

Both the old production tool and the newly-installed new production tool are tools or devices designed to perform corresponding processes on the wafers on the Fab. The old production tool has come into service on the Fab, and various performances, yield or the like meet the requirements of the processes. The newly-installed new production tool is a device the check for which is required, and their acceptability needs to be determined. As a result, the new production tool has not yet been put into production.

The new production tool newly installed on the Fab and the old production tool already available on the Fab are either the same tool or tools of the same type. In a specific embodiment, the new production tool and the old production tool are production tools or production devices in which (semiconductor) processes such as oxidation, photoetching, deposition, ion implantation, epitaxy, grinding, etching, sputtering or the like can occur. In particular, the new production tool and the old production tool may be one of a furnace tube device, a photoetching device, a depositing device, an ion implanting device, a grinding device, an etching device or a sputtering device. In other embodiments, the new production tool and the old production tool may also be production tools or production devices configured for other processes on the Fab.

S21 is executed: providing several wafers to be detected, the several wafers to be detected being divided into a first portion of wafers and a second portion of wafers.

The wafers to be detected are those whose yield is subsequently required to be detected after the relevant processes on the new or old production tools. The several wafers to be detected are divided into the first portion of wafers, which later undergo the corresponding processes in the new production tool, and the second portion of wafers, which later undergo the corresponding processes in the old production tool.

In an embodiment, the several wafers to be detected are several lots of wafers to be detected, and accordingly the odd-numbered wafers in each lot are taken as the first portion of wafers and the even-numbered wafers in each lot are taken as the second portion of wafers, or accordingly the even-numbered wafers in each lot are taken as the first portion of wafers and the odd-numbered wafers in each lot are taken as the second portion of wafers. Hence, during the subsequent detection, the yield of the wafers themselves has a minimum impact on the detection results, improving the accuracy of the detection results.

In an embodiment, the numbers of the first portion of wafers and the second portion of wafers are both greater than 10, which accordingly increases the number of valid samples of the yield data obtained later.

S22 is executed: performing corresponding processes on the first portion of wafers in the new production tool; and S23 is executed: performing corresponding processes on the second portion of wafers in the old production tool.

In particular, corresponding processes are performed on the first portion of wafers in sequence in the new production tool, and on the second portion of wafers in sequence in the old production tool. The process is one of oxidation, photoetching, deposition, ion implantation, epitaxy, grinding, etching or sputtering.

S24 is executed: performing yield measurement on the first portion of wafers subjected to the processes in the new production tool, to obtain several new tool yield data; and S25 is executed: performing yield measurement on the second portion of wafers subjected to the processes in the old production tool, to obtain several old tool yield data.

The procedure of measuring the first portion of wafers and the procedure of measuring the second portion of wafers are performed on the same measuring device, and both the measurement program and the parameters that need to be measured are the same during the measurement.

Each wafer has a yield data after the measurement, i.e., each wafer in the first portion of wafers has a new tool yield data, and each wafer in the second portion of wafers has an old tool yield data after the measurement.

In some embodiments, both the new tool yield data and the old tool yield data are means of several yields that result from the measurements on the corresponding wafers.

In some embodiments, S26 also needs to be executed: determining whether the number of the new tool yield data and the number of the old tool yield data are both greater than 10, if "yes", executing S27, and if "no", executing S29 to end the check flow.

The purpose of executing S26 is to ensure that there are sufficient samples for the subsequent data analysis in step S27, and to improve the accuracy of data analysis. In other embodiments, S27 may also be executed directly without executing S26.

S27 is executed: performing data analysis on the several new tool yield data and the several old tool yield data, determining whether the several new tool yield data and the several old tool yield data belong to a high yield category or a slightly higher yield category, eliminating the corresponding new tool yield data and old tool yield data if "the several new tool yield data and the several old tool yield data belong to the high yield category or the slightly higher yield category", and taking the remaining new tool yield data and the remaining old tool yield data respectively as screened new tool yield data and screened old tool yield data.

According to researches, while determining whether the new tool is acceptable or not, the new tool yield data and the old tool yield data that belong to the high yield category or the slightly higher yield category have a great influence on the accuracy and effectiveness of the new tool acceptability check results, as a result of which the new tool yield data and the old tool yield data that belong to the high yield category or the slightly higher yield category need to be eliminated while determining whether the new tool is acceptable or not, in order to improve the accuracy of the new tool acceptability check results and the efficiency of the new tool acceptability check procedure.

A Data Analysis Method Based on Fuzzy System Models (DA-FSM) is used as the method for data analysis of the several new tool yield data and the several old tool yield data.

Figure 2:
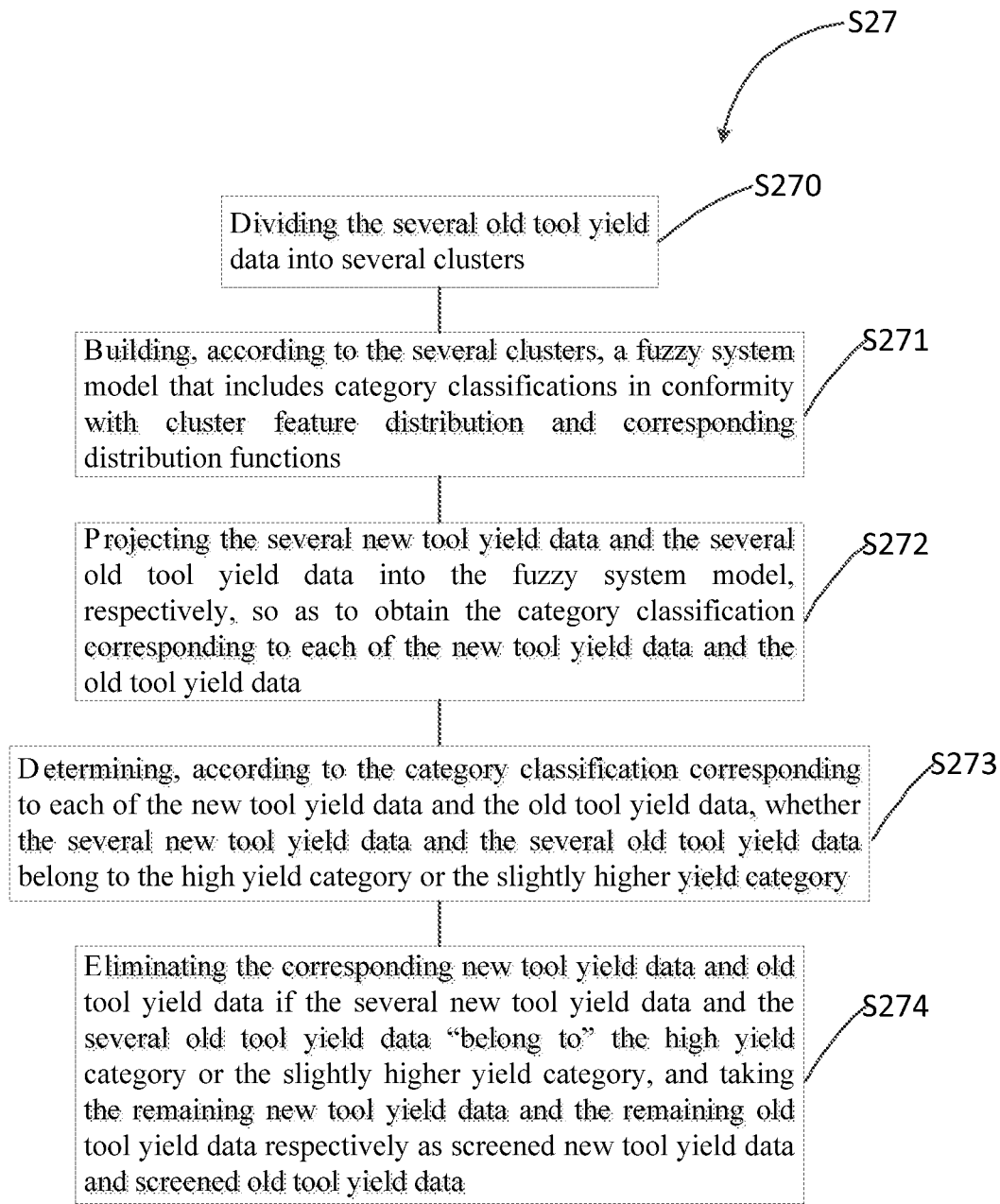

In some embodiments, with reference to FIG. 2, S27 may specifically include: S270: dividing the several old tool yield data into several clusters; S271: building, according to the several clusters, a fuzzy system model that includes category classifications in conformity with cluster feature distribution and corresponding distribution functions, the fuzzy system model being one of a model $\alpha$, a model $\beta$ or a model $\gamma$, the model $\alpha$ including three category classifications and three corresponding distribution functions, the three category classifications being a low yield category, a medium yield category and a high yield category, the model ß including two category classifications and two corresponding distribution functions, the two category classifications being a slightly lower yield category and a slightly higher yield category, the model $\alpha$ including one category classification and one corresponding distribution function, and the one category classification being an overall yield category; S272: projecting the several new tool yield data and the several old tool yield data into the fuzzy system model, respectively, so as to obtain the category classification corresponding to each of the new tool yield data and the old tool yield data; S273: determining, according to the category classification corresponding to each of the new tool yield data and the old tool yield data, whether the several new tool yield data and the several old tool yield data belong to the high yield category or the slightly higher yield category; and S274: eliminating the corresponding new tool yield data and old tool yield data if the several new tool yield data and the several old tool yield data "belong to" the high yield category or the slightly higher yield category, and taking the remaining new tool yield data and the remaining old tool yield data respectively as screened new tool yield data and screened old tool yield data.

In particular, in S270, the several old tool yield data may be divided into several clusters using a K-Means clustering algorithm or other grouping or clustering algorithms.

In some embodiments, a description is given with reference to the example of using the K-Means clustering algorithm to divide the several old tool yield data into several clusters, and the following steps are included:

(1) the several old tool yield data are set as one point set S, which needs to be divided into N categories or clusters, and N is set as required;
(2) K is set to be equal to N and N points are randomly chosen as initial center points;
(3) the distances from each point to these N center points are calculated, the closest center point is chosen and then included into a group centered in this center point;
(4) the center points of the N new clusters are recalculated; and
(5) the K-Means procedure ends, provided that the center points remain unchanged. Otherwise, steps (3) and (4) are repeated.

In the embodiments of the present application, the several old tool yield data are divided at most into three clusters, e.g., 3 clusters, 2 clusters or 1 cluster. Thus, the efficiency of building the fuzzy system model later may be increased, and with the built fuzzy system model, the category classifications for the new and old tool yield data can be reflected in a simple and accurate way. In other embodiments, the several old tool yield data may be divided into more clusters.

Figure 5:
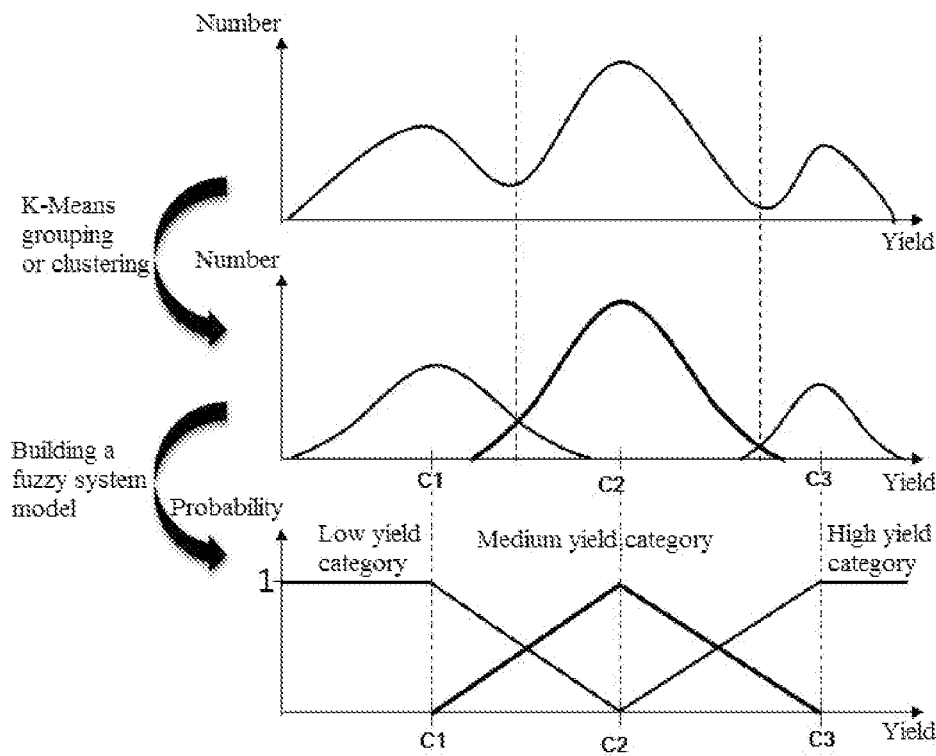
FIG. 5 to FIG. 8 are schematic structural diagrams of the acceptability check procedure for newly-added production tools according to the embodiments of the present application.

In some embodiments, a description is given with reference to the example that the value K is equal to 3. Referring to FIG. 5, the uppermost drawing in FIG. 5 is a graph showing distribution of the several old tool yield data, where the abscissa represents the yield and the ordinate represents the number. The middle drawing in FIG. 5 is a distribution diagram of 3 clusters after the K-Means clustering algorithm, where the abscissa represents the yield and the ordinate represents the number, and 3 clusters have 3 center points corresponding thereto, i.e., C1, C2, and C3.

With continued reference to FIG. 2, S271 is executed: building, according to the several clusters, a fuzzy system model that includes category classifications in conformity with cluster feature distribution and corresponding distribution functions. While the fuzzy system model is built, the number of the category classifications and the number of the corresponding distribution functions are determined from the number of the clusters, e.g., in the case of 3 clusters, there are 3 category classifications and 3 corresponding distribution functions. In an embodiment, the fuzzy system model is one of a model γ, a model ß or a model α, the model α includes three category classifications and three corresponding distribution functions, the three category classifications are a low yield category, a medium yield category and a high yield category, the model ß includes two category classifications and two corresponding distribution functions, the two category classifications are a slightly lower yield category and a slightly higher yield category, the model α includes one category classification and one corresponding distribution function, and the one category classification is an overall yield category. In particular, the fuzzy system model is built as the model γ when the several old tool yield data are divided into three clusters in S270, the fuzzy system model is built as the model ß when the several old tool yield data are divided into two clusters in S270, and the fuzzy system model is built as the model γ when the several old tool yield data are divided into one cluster in S270.

Figure 6:
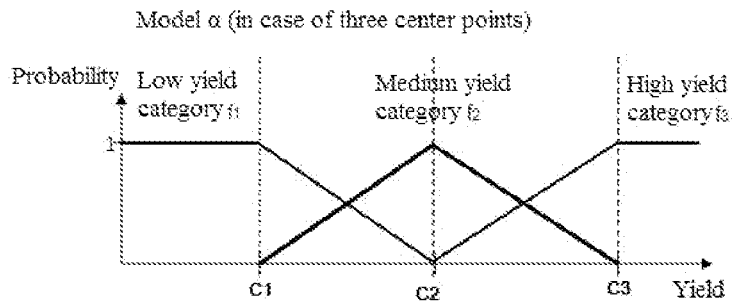

In an embodiment, with reference to FIG. 5, the lowermost drawing in FIG. 5 is a broken line graph showing distribution of the several old tool yield data obtained from the built fuzzy system model, where the abscissa represents the yield and the ordinate represents the probability. The category classifications in conformity with cluster feature distribution and the corresponding distribution functions in the fuzzy system model may be obtained in accordance with this broken line graph as well as three center points C1, C2, and C3. In particular, referring to FIG. 6, FIG. 6 is a schematic structural diagram characterizing the model α. The model α is a fuzzy system model that is built when the several old tool yield data are divided into three clusters. The model a includes three category classifications and three corresponding distribution functions. The three category classifications are a low yield category $f_1$, a medium yield category $f_2$ and a high yield category $f_3$, and are corresponding to three distribution functions $f_1(x_j)$, $f_2(x_j)$ and $f_3(x_j)$. C1, C2 and C3 represent the yield values corresponding to three center points, and $x_j$ represents the yield variable.

Figure 7:
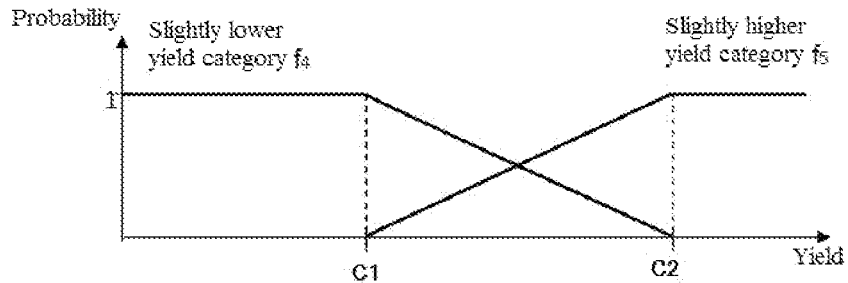

In another embodiment, referring to FIG. 7, FIG. 7 is a schematic structural diagram characterizing the model β.

The model β is a fuzzy system model that is built when the several old tool yield data are divided into two clusters. The model β includes two category classifications and two corresponding distribution functions. The two category classifications are a slightly lower yield category $f_4$ and a slightly higher yield category $f_5$, and are corresponding to two distribution functions $f_4(x_j)$ and $f_5(x_j)$. C1 and C2 represent the yield values corresponding to two center points, and $x_j$ represents the yield variable.

Figure 8:
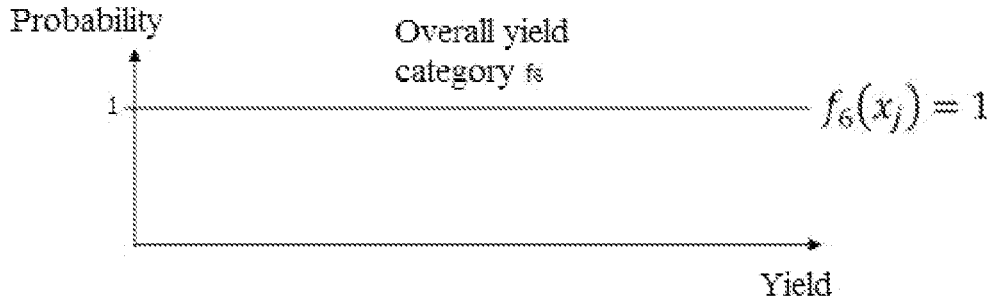

In another embodiment, referring to FIG. 8, FIG. 8 is a schematic structural diagram characterizing the model γ. The model γ is a fuzzy system model that is built when the several old tool yield data are divided into one cluster. The model γ includes one category classification and one corresponding distribution function. The one category classification is an overall yield category $f_6$, and is corresponding to one distribution function $f_6(x_j)$. $x_j$ represents the yield variable.

In S272, the several new tool yield data and the several old tool yield data are projected into the fuzzy system model, respectively, so as to obtain the category classification corresponding to each of the new tool yield data and the old tool yield data. In particular, the several new tool yield data and the several old tool yield data are projected into one of the model α, the model β or the model γ, so as to obtain the category classification corresponding to each of the new tool yield data and the old tool yield data. The corresponding category classification is the one corresponding to a particular distribution function when a probability maximum is obtained from calculation of this distribution function. For example, when the several new tool yield data and the several old tool yield data are respectively projected into the model a, the several new tool yield data and the several old tool yield data are sequentially projected, as the variable $x_j$, into the distribution functions $f_1(x_j)$, $f_2(x_j)$ and $f_3(x_j)$ shown in FIG. 6, to obtain corresponding probabilities. If the probability obtained from calculation of the distribution function $f_1(x_j)$ is the largest one, then the category classification corresponding to the new tool yield data or old tool yield data is the "low yield category"; if the probability obtained from calculation of the distribution function $f_2(x_j)$ is the largest one, then the category classification corresponding to the new tool yield data or old tool yield data is the "medium yield category", and if the probability obtained from calculation of the distribution function $f_3(x_j)$ is the largest one, then the category classification corresponding to the new tool yield data or old tool yield data is the "high yield category". The procedure of projecting the new tool yield data and the old tool yield data respectively into the model β or the model γ so as to obtain the category classification corresponding to each of the new tool yield data and the old tool yield data is similar to the procedure of projecting into the model α so as to obtain the category classification corresponding to each of the new tool yield data and the old tool yield data.

In S273, according to the category classification corresponding to each of the new tool yield data and the old tool yield data, it is determined whether the several new tool yield data and the several old tool yield data belong to the high yield category or the slightly higher yield category; and in S274, the corresponding new tool yield data and old tool yield data are eliminated if the several new tool yield data and the several old tool yield data "belong to" the high yield category or the slightly higher yield category, and the remaining new tool yield data and the remaining old tool yield data are taken as screened new tool yield data and screened old tool yield data. The accuracy and efficiency in determination can be improved in the subsequent S28, by eliminating the new tool yield data and the old tool yield data that belong to the high yield category or the slightly higher yield category.

Figure 3:
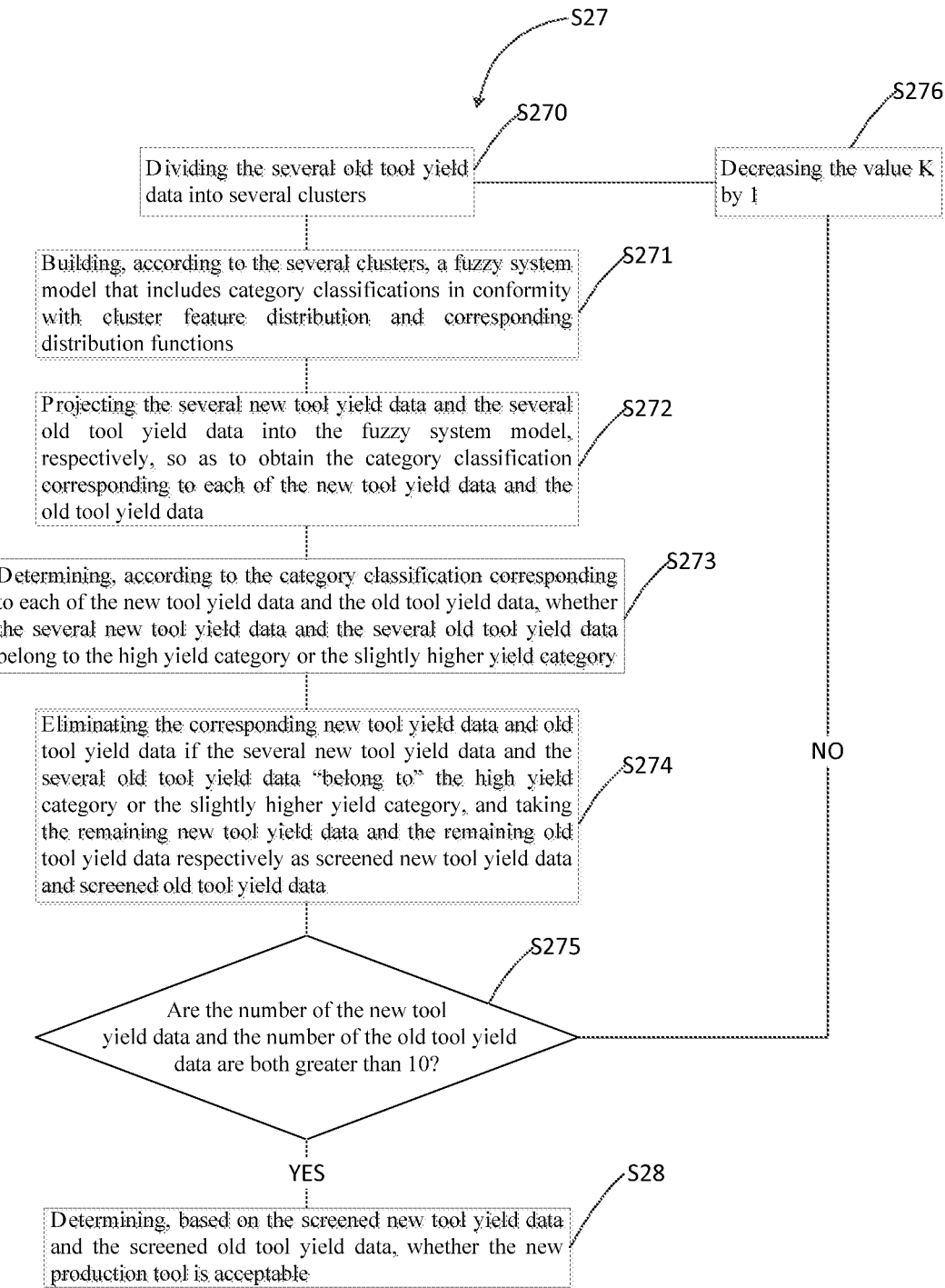

In some embodiments, to further improve the accuracy of the obtained category classification corresponding to each of the new tool yield data and the old tool yield data and accordingly improve the accuracy of the new tool acceptability check results, referring to FIG. 3, when dividing the several old tool yield data into several clusters in S270, a value K in the K-Means clustering algorithm is preset to be equal to 3, and then the several old tool yield data are divided into three clusters through the K-Means clustering algorithm; at the time of execution of S271, a fuzzy system model is built according to the three clusters, the fuzzy system model is a model a and includes category classifications in conformity with cluster feature distribution and corresponding distribution functions, and at the time of execution of S272, several new tool yield data and several old tool yield data are projected into the model α, respectively, so as to obtain the category classification corresponding to each of the new tool yield data and the old tool yield data; when determining, according to the category classification corresponding to each of the new tool yield data and the old tool yield data, whether the several new tool yield data and the several old tool yield data belong to the high yield category or the slightly higher yield category in S273, it is only determined whether the several new tool yield data and the several old tool yield data belong to the high yield category according to the category classification corresponding to each of the new tool yield data and the old tool yield data; when eliminating the corresponding new tool yield data and old tool yield data if the several new tool yield data and the several old tool yield data "belong to" the high yield category or the slightly higher yield category and taking the remaining new tool yield data and the remaining old tool yield data respectively as screened new tool yield data and screened old tool yield data in S274, it is only required that the corresponding new tool yield data and old tool yield data are eliminated if the several new tool yield data and the several old tool yield data "belong to" the high yield category and the remaining new tool yield data and the remaining old tool yield data are taken as the screened new tool yield data and the screened old tool yield data; after the screened new tool yield data and the screened old tool yield data are obtained, S275 is also required to be executed: determining whether the numbers of the screened new tool yield data and the screened old tool yield data are both greater than 10; if "yes", S28 is executed, a step of determining whether the new production tool is acceptable based on the screened new tool yield data and the screened old tool yield data, and if "no", S276 is executed: decreasing the value K by 1; then, when the value K is equal to 2, continue to execute S270: dividing the several old tool yield data into two clusters through the K-Means clustering algorithm; then, S271 is executed: building, according to the two clusters, a fuzzy system model, which is the model ß; then, S272 is executed: projecting several new tool yield data and several old tool yield data into the model β, respectively, so as to obtain the category classification corresponding to each of the new tool yield data and the old tool yield data; then, S273 is executed: determining, according to the category classification corresponding to each of the new tool yield data and the old tool yield data, whether the several new tool yield data and the several old tool yield data belong to the slightly higher yield category, and then S274 is executed: removing the corresponding new tool yield data and old tool yield data if the several new tool yield data and the several old tool yield data "belong to" the slightly higher yield category, and taking the remaining new tool yield data and the remaining old tool yield data respectively as screened new tool yield data and screened old tool yield data; then, S275 is executed: continuing to determine whether the numbers of the screened new tool yield data and the screened old tool yield data are both greater than 10; if "yes", S28 is executed, a step of determining whether the new production tool is acceptable based on the screened new tool yield data and the screened old tool yield data, and if "no", S276 is executed: decreasing the value K by 1; then S270 is executed: dividing the several old tool yield data into one cluster through the K-Means clustering algorithm when the value K is equal to 1; then, S271 is executed: building, according to the one cluster, a fuzzy system model, which is the model γ; then, S272 is executed: projecting several new tool yield data and several old tool yield data into the model γ, respectively, so as to obtain the category classification corresponding to each of the new tool yield data and the old tool yield data, and taking the new tool yield data and the old tool yield data directly as screened new tool yield data and screened old tool yield data.

With continued reference to FIG. 1, S28 is executed: determining whether the new production tool is acceptable based on the screened new tool yield data and the screened old tool yield data.

Figure 4:
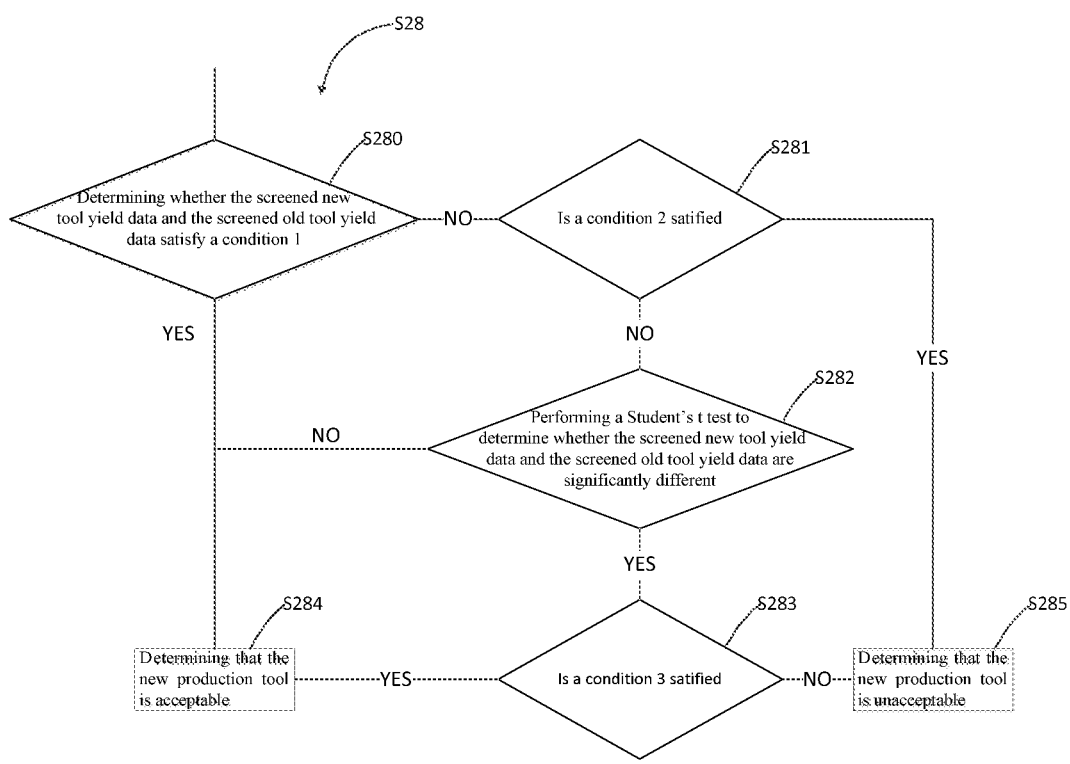

In some embodiments, referring to FIG. 4, the procedure of determining whether the new production tool is acceptable based on the screened new tool yield data and the screened old tool yield data includes: executing S280 of determining whether the screened new tool yield data and the screened old tool yield data satisfy a condition 1, the condition 1 being that the mean of the screened new tool yield data is greater than or equal to the mean of the screened old tool yield data and the standard deviation of the screened new tool yield data is less than or equal to the standard deviation of the screened old tool yield data; if "yes", executing S285 of determining that the new production tool is acceptable; and if "no", proceeding to a further determination. The purpose of the further determination is to further verify the data not satisfying the condition 1, in order to further determine whether the new production tool is acceptable, avoid the situation where the acceptable production tool is determined as unacceptable, and also improve the accuracy of the new tool acceptability check results. In other embodiments, the step of the further determination may not be executed.

In some embodiments, with continued reference to FIG. 4, the further determination includes: executing S281 of determining whether the screened new tool yield data and the screened old tool yield data satisfy a condition 2, the condition 2 being that the mean of the screened new tool yield data is less than the mean of the screened old tool yield data and the standard deviation of the screened new tool yield data is greater than the standard deviation of the screened old tool yield data; if "yes", executing S285 of determining that the new production tool is unacceptable, if "no", executing S282 of performing a Student's t test to determine whether the screened new tool yield data and the screened old tool yield data are significantly different; if "no", then executing S284 of determining that the new production tool is acceptable, if "yes", then executing S283 of determining whether the screened new tool yield data and the screened old tool yield data satisfy a condition 3, the condition 3 being that the mean of the screened new tool yield data is greater than or equal to the mean of the screened old tool yield data; if "yes", then executing S284 of determining that the new production tool is acceptable, and if "no", then executing S285 of determining that the new production tool is unacceptable.

In some embodiments, at the time of execution of S282, the Student's t test employs a two-sided test, with a statistical significance level of α=0.05, and two hypothesis tests: H0: the yield data of the new tool are significantly different from the yield data of the old tool, and H1: there is no significant difference between the yield data of the new tool and the yield data of the old tool. The Student's t test will produce one of the results (support H0 but reject H1) and (support H1 but reject H0). If H0 is supported but H1 is rejected, it means that our first hypothesis H0 (the presence of a significant difference) is proved to be correct, i.e., there is a significant difference between the yield data of the new tool and the yield data of the old tool. On the contrary, if the hypothesis H1 is supported, then there is no significant difference between the yield data of the new tool and the yield data of the old tool.

Figure 9:
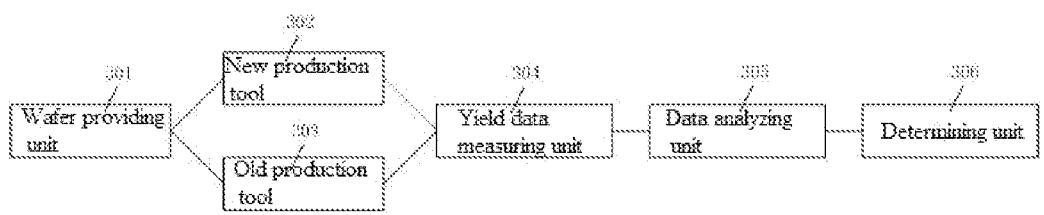
FIG. 9 is a schematic structural diagram of the acceptability check system for newly-added production tools according to the embodiments of the present application.

The embodiments of the present application also provide an acceptability check system for newly-added production tools, which, with reference to FIG. 9, includes:
 a wafer providing unit 301, configured to provide several wafers to be detected, the several wafers to be detected being divided into a first portion of wafers and a second portion of wafers;
 a new production tool 302, configured to perform corresponding processes on the first portion of wafers;
 an old production tool 303, configured to perform corresponding processes on the second portion of wafers;
 a yield data measuring unit 304, configured to perform yield measurement on the first portion of wafers subjected to the processes in the new production tool, to obtain several new tool yield data, and perform yield measurement on the second portion of wafers subjected to the processes in the old production tool, to obtain several old tool yield data;
 a data analyzing unit 305, configured to perform data analysis on the several new tool yield data and the several old tool yield data, determine whether the several new tool yield data and the several old tool yield data belong to a high yield category or a slightly higher yield category, eliminate the corresponding new tool yield data and old tool yield data if "the several new tool yield data and the several old tool yield data belong to the high yield category or the slightly higher yield category", and take the remaining new tool yield data and the remaining old tool yield data respectively as screened new tool yield data and screened old tool yield data; and
 a determining unit 306, configured to determine, based on the screened new tool yield data and the screened old tool yield data, whether the new production tool is acceptable.

In some embodiments, the several wafers to be detected, which are provided by the wafer providing unit 301, are several lots of wafers to be detected, and accordingly the odd-numbered wafers in each lot are taken as the first portion of wafers and the even-numbered wafers in each lot are taken as the second portion of wafers, or accordingly the even-numbered wafers in each lot are taken as the first portion of wafers and the odd-numbered wafers in each lot are taken as the second portion of wafers.

A data analysis method based on fuzzy system models is used as the method for data analysis of the several new tool yield data and the several old tool yield data by the data analyzing unit 305.

In some embodiments, the procedure of performing data analysis on the several new tool yield data and the several old tool yield data and determining whether the several new tool yield data and the several old tool yield data belong to a high yield category or a slightly higher yield category by the data analyzing unit 305 includes: dividing the several old tool yield data into several clusters; building, according to the several clusters, a fuzzy system model that includes category classifications in conformity with cluster feature distribution and corresponding distribution functions, the fuzzy system model being one of a model α, a model ß or a model γ, the model α including three category classifications and three corresponding distribution functions, the three category classifications being a low yield category, a medium yield category and a high yield category, the model ß including two category classifications and two corresponding distribution functions, the two category classifications being a slightly lower yield category and a slightly higher yield category, the model γ including one category classification and one corresponding distribution function, and the one category classification being an overall yield category; projecting several new tool yield data and several old tool yield data into the fuzzy system model, respectively, so as to obtain the category classification corresponding to each of the new tool yield data and the old tool yield data; and determining, according to the category classification corresponding to each of the new tool yield data and the old tool yield data, whether the several new tool yield data and the several old tool yield data belong to the high yield category or the slightly higher yield category.

In some embodiments, the several old tool yield data are divided into several clusters using a K-Means clustering algorithm or other grouping or clustering algorithms.

In some embodiments, a data sample number determining unit (not shown in the drawings) is further included, which is configured to: determine, before the several old tool yield data are divided into several clusters by the data analyzing unit, whether numbers of the new tool yield data and the number of the old tool yield data are both greater than 10, if "yes", execute the step of dividing the several old tool yield data into several clusters, and if "no", end the check flow.

In some embodiments, the procedure of dividing into several clusters, building the fuzzy system model, obtaining the category classification corresponding to each of the new tool yield data and the old tool yield data, determining whether the several new tool yield data and the several old tool yield data belong to the high yield category or the slightly higher yield category and obtaining the screened new tool yield data and the screened old tool yield data by the data analyzing unit 305 includes: when dividing the several old tool yield data into several clusters, presetting a value K in the K-Means clustering algorithm to be equal to 3, and then dividing the several old tool yield data into three clusters through the K-Means clustering algorithm; building, according to the three clusters, a fuzzy system model, which is a model a; projecting several new tool yield data and several old tool yield data into the model α, respectively, so as to obtain the category classification corresponding to each of the new tool yield data and the old tool yield data; determining, according to the category classification corresponding to each of the new tool yield data and the old tool several old tool yield data belong to the high yield category, eliminating the corresponding new tool yield data and old tool yield data if "the several new tool yield data and the several old tool yield data belong to the high yield category", and taking the remaining new tool yield data and the remaining old tool yield data respectively as screened new tool yield data and screened old tool yield data; determining whether the numbers of the screened new tool yield data and the screened old tool yield data are both greater than 10, if "yes", executing the step of determining whether the new production tool is acceptable based on the screened new tool yield data and the screened old tool yield data, if "no", decreasing the value K by 1, and dividing the several old tool yield data into two clusters through the K-Means clustering algorithm when the value K is equal to 2; building, according to the two clusters, a fuzzy system model, which is the model ß; projecting several new tool yield data and several old tool yield data into the model ß, respectively, so as to obtain the category classification corresponding to each of the new tool yield data and the old tool yield data; determining, according to the category classification corresponding to each of the new tool yield data and the old tool yield data, whether the several new tool yield data and the several old tool yield data belong to the slightly higher yield category, eliminating the corresponding new tool yield data and old tool yield data if "the several new tool yield data and the several old tool yield data belong to the slightly higher yield category", and taking the remaining new tool yield data and the remaining old tool yield data respectively as screened new tool yield data and screened old tool yield data; continuing to determine whether the numbers of the screened new tool yield data and the screened old tool yield data are both greater than 10, if "yes", executing the step of determining whether the new production tool is acceptable based on the screened new tool yield data and the screened old tool yield data, if "no", decreasing the value K by 1, and dividing the several old tool yield data into one cluster through the K-Means clustering algorithm when the value K is equal to 1; building, according to the one cluster, a fuzzy system model, which is the model γ; projecting several new tool yield data and several old tool yield data into the model γ, respectively, so as to obtain the category classification corresponding to each of the new tool yield data and the old tool yield data, and taking the new tool yield data and old tool yield data directly as screened new tool yield data and screened old tool yield data.

In some embodiments, the procedure of determining whether the new production tool is acceptable based on the screened new tool yield data and the screened old tool yield data by the determining unit 306 includes: determining whether the screened new tool yield data and the screened old tool yield data satisfy a condition 1, the condition 1 being that the mean of the screened new tool yield data is greater than or equal to the mean of the screened old tool yield data and the standard deviation of the screened new tool yield data is less than or equal to the standard deviation of the screened old tool yield data, if "yes", determining that the new production tool is acceptable; and if "no", proceeding to a further determination.

In some embodiments, the further determination includes: determining whether the screened new tool yield data and the screened old tool yield data satisfy a condition 2, the condition 2 being that the mean of the screened new tool yield data is less than the mean of the screened old tool yield data and the standard deviation of the screened new tool yield data is greater than the standard deviation of the screened old tool yield data, if "yes", determining that the new production tool is unacceptable, if "no", performing a Student's t test to determine whether the screened new tool yield data and the screened old tool yield data are significantly different, if "no", then determining that the new production tool is acceptable, if "yes", then determining whether the screened new tool yield data and the screened old tool yield data satisfy a condition 3, the condition 3 being that the mean of the screened new tool yield data is greater than or equal to the mean of the screened old tool yield data, if "yes", then determining that the new production tool is acceptable, and if "no", then determining that the new production tool is unacceptable.

It shall be noted that the definition or description of the same or similar sections in this embodiment (check system) as in the previous embodiment (check system) will not be given in this embodiment. Reference is made to the definition or description of the corresponding sections in the previous embodiment.

Although the present application has been disclosed as above in the preferred embodiments, the present application should not be limited by those embodiments. Any skilled in the art may make possible changes or modifications to the technical solutions of the present application by use of the methods and technical content disclosed above without departing from the spirit and scope of the present application. Therefore, any simple alterations, equivalent changes and modifications made to the foregoing embodiments based on the technical essence of the present application without departing from the technical solutions proposed in the present application are deemed to fall within the protection scope of the technical solutions in the present application.

What is claimed is:

1. An acceptability check method for newly-added production tools, comprising:
   providing a new production tool newly installed in a semiconductor fabrication facility, and an old production tool already available in the semiconductor fabrication facility;
   providing at least two wafers to be detected, the at least two wafers to be detected being divided into a first portion of wafers and a second portion of wafers;
   performing processes on the first portion of wafers in the new production tool, the processes comprising at least one of oxidation, photoetching, deposition, ion implantation, epitaxy, grinding, etching or sputtering, the new production tool comprising at least one of a first furnace tube device, a first photoetching device, a first deposition device, a first ion implanting device, a first grinding device, a first etching device or a first sputtering device;
   performing the processes on the second portion of wafers in the old production tool, the old production tool comprising at least one of a second furnace tube device, a second photoetching device, a second deposition device, a second ion implanting device, a second grinding device, a second etching device or a second sputtering device;
   performing yield measurement on the first portion of wafers subjected to the processes in the new production tool, to obtain at least two pieces of new tool yield data;
   performing the yield measurement on the second portion of wafers subjected to the processes in the old production tool, to obtain at least two pieces of old tool yield data;
   performing data analysis on the at least two pieces of new tool yield data and the at least two pieces of old tool yield data, determining whether the at least two pieces of new tool yield data and the at least two pieces of old tool yield data belong to a high yield category or a slightly higher yield category, eliminating a first portion of the at least two pieces of new tool yield data belonging to the high yield category or the slightly higher yield category and a first portion of the at least two pieces of old tool yield data belonging to the high yield category or the slightly higher yield category, and taking first remaining data of the at least two pieces of new tool yield data and first remaining data of the at least two pieces of old tool yield data respectively as screened new tool yield data and screened old tool yield data; and determining, based on the screened new tool yield data and the screened old tool yield data, whether the new production tool is acceptable;

wherein the performing data analysis on the at least two pieces of new tool yield data and the at least two pieces of old tool yield data to determine whether the at least two pieces of new tool yield data and the at least two pieces of old tool yield data belong to a high yield category or a slightly higher yield category comprises:

dividing the at least two pieces of old tool yield data into at least two clusters;

building, according to the at least two clusters, a fuzzy system model that comprises category classifications in conformity with cluster feature distribution and corresponding distribution functions, the fuzzy system model being one of a model α, a model β or a model γ, the model α comprising three category classifications and three corresponding distribution functions, the three category classifications being a low yield category, a medium yield category and a high yield category, the model ß comprising two category classifications and two corresponding distribution functions, the two category classifications being a slightly lower yield category and a slightly higher yield category, the model γ comprising one category classification and one corresponding distribution function, and the one category classification being an overall yield category;

projecting the at least two pieces of new tool yield data and the at least two pieces of old tool yield data into the fuzzy system model, respectively, so as to obtain the category classification corresponding to each of the at least two pieces of new tool yield data and the at least two pieces of old tool yield data; and determining, according to the category classification corresponding to each of the at least two pieces of new tool yield data and the at least two pieces of old tool yield data, whether the at least two pieces of new tool yield data and the at least two pieces of old tool yield data belong to the high yield category or the slightly higher yield category.

2. The acceptability check method for newly-added production tools of claim 1, wherein the at least two wafers to be detected are at least two lots of wafers to be detected, and accordingly odd-numbered wafers in each lot of the at least two lots are taken as the first portion of wafers and even-numbered wafers in each lot of the at least two lots are taken as the second portion of wafers, or accordingly the even-numbered wafers in each lot of the at least two lots are taken as the first portion of wafers and the odd-numbered wafers in each lot of the at least two lots are taken as the second portion of wafers.

3. The acceptability check method for newly-added production tools of claim 1, wherein the at least two pieces of old tool yield data are divided into the at least two clusters using a K-Means clustering algorithm.

4. The acceptability check method for newly-added production tools of claim 3, wherein the method, before the at least two pieces of old tool yield data are divided into the at least two clusters, further comprises:

determining whether a number of the at least two pieces of new tool yield data and a number of the at least two pieces of old tool yield data are both greater than 10;

when the number of the at least two pieces of new tool yield data and the number of the at least two pieces of old tool yield data are both greater than 10, executing the dividing the at least two pieces of old tool yield data into the at least two clusters; and when the number of the at least two pieces of new tool yield data and the number of the at least two pieces of old tool yield data are not both greater than 10, ending a check flow for the new production tool.

5. The acceptability check method for newly-added production tools of claim 4, wherein the dividing into the at least two clusters, the building the fuzzy system model, obtaining the category classification corresponding to each of the at least two pieces of new tool yield data and the at least two pieces of old tool yield data, the determining whether the at least two pieces of new tool yield data and the at least two pieces of old tool yield data belong to the high yield category or the slightly higher yield category and obtaining the screened new tool yield data and the screened old tool yield data comprises:

when dividing the at least two pieces of old tool yield data into the at least two clusters, presetting a value K in the K-Means clustering algorithm to be equal to 3, and then dividing the at least two pieces of old tool yield data into three clusters through the K-Means clustering algorithm;

building, according to the three clusters, the model α;

projecting the at least two pieces of several-new tool yield data and the at least two pieces of old tool yield data into the model a, respectively, so as to obtain the category classification corresponding to each of the at least two pieces of new tool yield data and the at least two pieces of old tool yield data;

determining, according to the category classification corresponding to each of the at least two pieces of new tool yield data and the at least two pieces of old tool yield data, whether the at least two pieces of new tool yield data and the at least two pieces of old tool yield data belong to the high yield category, eliminating a second portion of the at least two pieces of new tool yield data belonging to the high yield category and a second portion of the at least two pieces of old tool yield data belonging to the high yield category, and taking second remaining data of the at least two pieces of new tool yield data and second remaining data of the at least two pieces of old tool yield data respectively as the screened new tool yield data and the screened old tool yield data;

determining whether a number of the screened new tool yield data and a number of the screened old tool yield data are both greater than 10;

when the number of the screened new tool yield data and the number of the screened old tool yield data are both greater than 10, executing the determining whether the new production tool is acceptable based on the screened new tool yield data and the screened old tool yield data;

when the number of the screened new tool yield data and the number of the screened old tool yield data are not both greater than 10, decreasing a value K by 1, and dividing the at least two pieces of old tool yield data into two clusters through the K-Means clustering algorithm when the value K is equal to 2;

building, according to the two clusters, the model $\beta$;

projecting the at least two pieces of new tool yield data and the at least two pieces of old tool yield data into the model $\beta$, respectively, so as to obtain the category classification corresponding to each of the at least two pieces of new tool yield data and the at least two pieces of old tool yield data;

determining, according to the category classification corresponding to each of the at least two pieces of new tool yield data and the at least two pieces of old tool yield data, whether the at least two pieces of new tool yield data and the at least two pieces of old tool yield data belong to the slightly higher yield category, eliminating a third portion of the at least two pieces of new tool yield data belonging to the slightly higher yield category and a third portion of the at least two pieces of old tool yield data belonging to the slightly higher yield category, and taking third remaining data of the at least two pieces of new tool yield data and third remaining data of the at least two pieces of old tool yield data respectively as the screened new tool yield data and the screened old tool yield data;

continuing to determine whether the number of the screened new tool yield data and the number of the screened old tool yield data are both greater than 10;

when the number of the screened new tool yield data and the number of the screened old tool yield data are both greater than 10, executing the determining whether the new production tool is acceptable based on the screened new tool yield data and the screened old tool yield data;

when the number of the screened new tool yield data and the number of the screened old tool yield data are not both greater than 10, decreasing the value K by 1, and dividing the at least two pieces of old tool yield data into one cluster through the K-Means clustering algorithm when the value K is equal to 1;

building, according to the one cluster, the model $\gamma$; and projecting the at least two pieces of new tool yield data and the at least two pieces of old tool yield data into the model $\gamma$, respectively, so as to obtain the category classification corresponding to each of the at least two pieces of new tool yield data and the at least two pieces of old tool yield data, and taking the at least two pieces of new tool yield data and the at least two pieces of old tool yield data directly as the screened new tool yield data and the screened old tool yield data.

6. The acceptability check method for newly-added production tools of claim 1, wherein the determining whether the new production tool is acceptable based on the screened new tool yield data and the screened old tool yield data comprises:

determining whether the screened new tool yield data and the screened old tool yield data satisfy a condition 1, the condition 1 being that a mean of the screened new tool yield data is greater than or equal to a mean of the screened old tool yield data and a standard deviation of the screened new tool yield data is less than or equal to a standard deviation of the screened old tool yield data;

when the mean of the screened new tool yield data is greater than or equal to the mean of the screened old tool yield data and the standard deviation of the screened new tool yield data is less than or equal to the standard deviation of the screened old tool yield data, determining that the new production tool is acceptable; and when at least one of the mean of the screened new tool yield data is not greater than or equal to the mean of the screened old tool yield data or the standard deviation of the screened new tool yield data is not less than or equal to the standard deviation of the screened old tool yield data, proceeding to a further determination.

7. The acceptability check method for newly-added production tools of claim 6, wherein the further determination comprises:

determining whether the screened new tool yield data and the screened old tool yield data satisfy a condition 2, the condition 2 being that the mean of the screened new tool yield data is less than the mean of the screened old tool yield data and the standard deviation of the screened new tool yield data is greater than the standard deviation of the screened old tool yield data;

when the screened new tool yield data is less than the mean of the screened old tool yield data and the standard deviation of the screened new tool yield data is greater than the standard deviation of the screened old tool yield data, determining that the new production tool is unacceptable;

when at least one of the screened new tool yield data is not less than the mean of the screened old tool yield data or the standard deviation of the screened new tool yield data is not greater than the standard deviation of the screened old tool yield data, performing a Student's t test to determine whether the screened new tool yield data and the screened old tool yield data are significantly different;

when the screened new tool yield data and the screened old tool yield data are not significantly different, then determining that the new production tool is acceptable when the screened new tool yield data and the screened old tool yield data are significantly different, determining whether the screened new tool yield data and the screened old tool yield data satisfy a condition 3, the condition 3 being that the mean of the screened new tool yield data is greater than or equal to the mean of the screened old tool yield data;

when the mean of the screened new tool yield data is greater than or equal to the mean of the screened old tool yield data, then determining that the new production tool is acceptable; and when the mean of the screened new tool yield data is not greater than or equal to the mean of the screened old tool yield data, then determining that the new production tool is unacceptable.

8. An acceptability check system for newly-added production tools, comprising:

a wafer providing unit, configured to provide at least two wafers to be detected, the at least two wafers to be detected being divided into a first portion of wafers and a second portion of wafers;

a new production tool, configured to perform processes on the first portion of wafers, the processes comprising at least one of oxidation, photoetching, deposition, ion implantation, epitaxy, grinding, etching or sputtering, the new production tool comprising at least one of a first furnace tube device, a first photoetching device, a first deposition device, a first ion implanting device, a first grinding device, a first etching device or a first sputtering device;

an old production tool, configured to perform the processes on the second portion of wafers, the old production tool comprising at least one of a second furnace tube device, a second photoetching device, a second deposition device, a second ion implanting device, a second grinding device, a second etching device or a second sputtering device;

a yield data measuring unit, configured to perform yield measurement on the first portion of wafers subjected to the processes in the new production tool, to obtain at least two pieces of new tool yield data, and perform the yield measurement on the second portion of wafers subjected to the processes in the old production tool, to obtain at least two pieces of several old tool yield data;

a data analyzing unit, configured to perform data analysis on the at least two pieces of new tool yield data and the at least two pieces of old tool yield data, determine whether the at least two pieces of new tool yield data and the at least two pieces of old tool yield data belong to a high yield category or a slightly higher yield category, eliminate a first portion of the at least two pieces of new tool yield data belonging to the high yield category or the slightly higher yield category and a first portion of the at least two pieces of old tool yield data belonging to the high yield category or the slightly higher yield category, and take first remaining data of the at least two pieces of new tool yield data and first remaining data of the at least two pieces of old tool yield data respectively as screened new tool yield data and screened old tool yield data; and a determining unit, configured to determine, based on the screened new tool yield data and the screened old tool yield data, whether the new production tool is acceptable;

wherein performing data analysis on the at least two pieces of new tool yield data and the at least two pieces of old tool yield data to determine whether the at least two pieces of new tool yield data and the at least two pieces of old tool yield data belong to a high yield category or a slightly higher yield category by the data analyzing unit comprises:

dividing the at least two pieces of old tool yield data into at least two clusters;

building, according to the at least two clusters, a fuzzy system model that comprises category classifications in conformity with cluster feature distribution and corresponding distribution functions, the fuzzy system model being one of a model α, a model β or a model γ, the model α comprising three category classifications and three corresponding distribution functions, the three category classifications being a low yield category, a medium yield category and a high yield category, the model β comprising two category classifications and two corresponding distribution functions, the two category classifications being a slightly lower yield category and a slightly higher yield category, the model γ comprising one category classification and one corresponding distribution function, and the one category classification being an overall yield category;

projecting the at least two pieces of new tool yield data and the at least two pieces of old tool yield data into the fuzzy system model, respectively, so as to obtain the category classification corresponding to each of the at least two pieces of new tool yield data and the at least two pieces of old tool yield data; and determining, according to the category classification corresponding to each of the at least two pieces of new tool yield data and the at least two pieces of old tool yield data, whether the at least two pieces of new tool yield data and the at least two pieces of old tool yield data belong to the high yield category or the slightly higher yield category.

9. The acceptability check system for newly-added production tools of claim 8, wherein the at least two wafers to be detected, which are provided by the wafer providing unit, are at least two lots of wafers to be detected, and accordingly odd-numbered wafers in each lot of the at least two lots are taken as the first portion of wafers and even-numbered wafers in each lot of the at least two lots are taken as the second portion of wafers, or accordingly the even-numbered wafers in each lot of the at least two lots are taken as the first portion of wafers and the odd-numbered wafers in each lot of the at least two lots are taken as the second portion of wafers.

10. The acceptability check system for newly-added production tools of claim 8, wherein the at least two pieces of old tool yield data are divided into the at least two clusters using a K-Means clustering algorithm.

11. The acceptability check system for newly-added production tools of claim 10, wherein the acceptability check system further comprises a data sample number determining unit, which is configured to:

determine, before the at least two pieces of old tool yield data are divided into the at least two clusters by the data analyzing unit, whether a number of the at least two pieces of new tool yield data and a number of the at least two pieces of old tool yield data are both greater than 10;

when the number of the at least two pieces of new tool yield data and the number of the at least two pieces of old tool yield data are both greater than 10, execute dividing the at least two pieces of old tool yield data into the at least two clusters; and when the number of the at least two pieces of new tool yield data and the number of the at least two pieces of old tool yield data are not both greater than 10, end a check flow for the new production tool.

12. The acceptability check system for newly-added production tools of claim 11, wherein the dividing into the at least two clusters, the building the fuzzy system model, obtaining the category classification corresponding to each of the at least two pieces of new tool yield data and the at least two pieces of old tool yield data, the determining whether the at least two pieces of new tool yield data and the at least two pieces of old tool yield data belong to the high yield category or the slightly higher yield category and obtaining the screened new tool yield data and the screened old tool yield data by the data analyzing unit comprises:

when dividing the at least two pieces of old tool yield data into the at least two clusters, presetting a value K in the K-Means clustering algorithm to be equal to 3, and then dividing the at least two pieces of old tool yield data into three clusters through the K-Means clustering algorithm;

building, according to the three clusters, the model α;

projecting the at least two pieces of new tool yield data and the at least two pieces of old tool yield data into the model a, respectively, so as to obtain the category classification corresponding to each of the at least two pieces of new tool yield data and the at least two pieces of old tool yield data;

determining, according to the category classification corresponding to each of the at least two pieces of new tool yield data and the at least two pieces of old tool yield data, whether the at least two pieces of new tool yield data and the at least two pieces of old tool yield data belong to the high yield category, eliminating a second portion of the at least two pieces of new tool yield data belonging to the high yield category and a second portion of the at least two pieces of old tool yield data belonging to the high yield category, and taking second remaining data of the at least two pieces of new tool yield data and second remaining data of the at least two pieces of old tool yield data respectively as the screened new tool yield data and the screened old tool yield data;

determining whether a number of the screened new tool yield data and a number of the screened old tool yield data are both greater than 10;

when the number of the screened new tool yield data and the number of the screened old tool yield data are both greater than 10, executing the step of determining whether the new production tool is acceptable based on the screened new tool yield data and the screened old tool yield data;

when the number of the screened new tool yield data and the number of the screened old tool yield data are not both greater than 10, decreasing a value K by 1, and dividing the at least two pieces of old tool yield data into two clusters through the K-Means clustering algorithm when the value K is equal to 2;

building, according to the two clusters, the model $\beta$;

projecting the at least two pieces of new tool yield data and the at least two pieces of old tool yield data into the model $\beta$, respectively, so as to obtain the category classification corresponding to each of the at least two pieces of new tool yield data and the at least two pieces of old tool yield data;

determining, according to the category classification corresponding to each of the at least two piece of new tool yield data and the at least two pieces of old tool yield data, whether the at least two pieces of new tool yield data and the at least two pieces of old tool yield data belong to the slightly higher yield category, eliminating a third portion of the at least two pieces of new tool yield data belonging to the slightly higher yield category and a third portion of the at least two pieces of old tool yield data belonging to the slightly higher yield category, and taking third remaining data of the at least two pieces of new tool yield data and third remaining data of the at least two pieces of old tool yield data respectively as the screened new tool yield data and the screened old tool yield data;

continuing to determine whether the number of the screened new tool yield data and the number of the screened old tool yield data are both greater than 10;

when the number of the screened new tool yield data and the number of the screened old tool yield data are both greater than 10, executing the determining whether the new production tool is acceptable based on the screened new tool yield data and the screened old tool yield data;

when the number of the screened new tool yield data and the number of the screened old tool yield data are both greater than 10, decreasing the value K by 1, and dividing the at least two pieces of old tool yield data into one cluster through the K-Means clustering algorithm when the value K is equal to 1;

building, according to the one cluster, the model $\gamma$; and projecting the at least two pieces of new tool yield data and the at least two pieces of old tool yield data into the model $\gamma$, respectively, so as to obtain the category classification corresponding to each of the at least two pieces of new tool yield data and the at least two pieces of old tool yield data, and taking the at least two pieces of new tool yield data and the at least two pieces of old tool yield data directly as the screened new tool yield data and the screened old tool yield data.

13. The acceptability check system for newly-added production tools of claim 8, wherein the determining whether the new production tool is acceptable based on the screened new tool yield data and the screened old tool yield data by the determining unit comprises:

determining whether the screened new tool yield data and the screened old tool yield data satisfy a condition 1, the condition 1 being that a mean of the screened new tool yield data is greater than or equal to a mean of the screened old tool yield data and a standard deviation of the screened new tool yield data is less than or equal to a standard deviation of the screened old tool yield data;

when the mean of the screened new tool yield data is greater than or equal to the mean of the screened old tool yield data and the standard deviation of the screened new tool yield data is less than or equal to the standard deviation of the screened old tool yield data, determining that the new production tool is acceptable; and when at least one of the mean of the screened new tool yield data is not greater than or equal to the mean of the screened old tool yield data or the standard deviation of the screened new tool yield data is not less than or equal to the standard deviation of the screened old tool yield data, proceeding to a further determination.

14. The acceptability check system for newly-added production tools of claim 13, wherein the further determination comprises:

determining whether the screened new tool yield data and the screened old tool yield data satisfy a condition 2, the condition 2 being that the mean of the screened new tool yield data is less than the mean of the screened old tool yield data and the standard deviation of the screened new tool yield data is greater than the standard deviation of the screened old tool yield data;

when the screened new tool yield data is less than the mean of the screened old tool yield data and the standard deviation of the screened new tool yield data is greater than the standard deviation of the screened old tool yield data, determining that the new production tool is unacceptable;

when at least one of the screened new tool yield data is not less than the mean of the screened old tool yield data or the standard deviation of the screened new tool yield data is not greater than the standard deviation of the screened old tool yield data, performing a Student's t test to determine whether the screened new tool yield data and the screened old tool yield data are significantly different;

when the screened new tool yield data and the screened old tool yield data are not significantly different, determining that the new production tool is acceptable;

when the screened new tool yield data and the screened old tool yield data are significantly different, determining whether the screened new tool yield data and the screened old tool yield data satisfy a condition 3, the condition 3 being that the mean of the screened new tool yield data is greater than or equal to the mean of the screened old tool yield data;

when the mean of the screened new tool yield data is greater than or equal to the mean of the screened old tool yield data, then determining that the new production tool is acceptable; and when the mean of the screened new tool yield data is not greater than or equal to the mean of the screened old tool yield data, then determining that the new production tool is unacceptable.

\* \* \* \* \*